Patented Feb. 5, 1946

2,394,223

UNITED STATES PATENT OFFICE 2,394,223

PENTAERYTHRITOL TETRANITRATE RECOVERY

Joseph A. Wyler, Allentown, Pa., assignor to Trojan Powder Company, Allentown, Pa.

No Drawing. Application November 6, 1941, Serial No. 418,007

2 Claims. (Cl. 260—467)

This invention relates in general to a process for the recovery of pentaerythritol tetranitrate from mixtures of pentaerythritol tetranitrate and nitrotoluenes and more particularly to the recovery of pentaerythritol tetranitrate from such mixtures as Pentolite which is essentially a mixture of one part of pentaerythritol tetranitrate and one part of trinitrotoluene together with small amounts of bonding agents or lubricants, such as ceresine, stearic acid, or graphite.

The principal object of my invention is to recover both the pentaerythritol tetranitrate and the nitrotoluenes in valuable forms from various types of ammunition now being used in warfare, in which pentaerythritol tetranitrate is in intimate contact with trinitrotoluene, dinitrotoluene or mononitrotoluene.

At the present time mixtures of trinitrotoluene and pentaerythritol tetranitrate are used in Oerlikon shells, torpedoes, anti-submarine bombs and for certain small sized artillery pieces and these mixtures are amenable to my process. Also, mixtures of pentaerythritol tetranitrate, trinitrotoluene, aluminum and ammonium nitrate, which are used in bombs may advantageously be subjected to my process. Similarly, pentaerythritol tetranitrate which has been desensitized with dinitrotoluene or mononitrotoluene may also be given my treatment.

I have discovered that if an acetone solution of pentaerythritol tetranitrate and a nitrotoluene is slowly treated with water, with thorough agitation of the mixture, that the pentaerythritol tetranitrate is the first to separate. If the water is added cautiously and the stirring made very turbulent the pentaerythritol tetranitrate will separate in a high state of purity (over 96% pure). As the addition of the water proceeds, the pentaerythritol tetranitrate continues to separate in the form of distinct crystals and the effect of each addition of water can be observed; eventually it will be found that the further addition of water causes the precipitation of an oil-like product instead of a crystalline one. Just before this stage is reached it is best to filter off the pentaerythritol tetranitrate crystals in order to prevent their contamination by this oily product which is mainly a nitrotoluene containing some acetone. The filtrate from the pentaerythritol tetranitrate is treated with a large excess of water in the same manner as described above, and the nitrotoluene separated by any suitable method, as filtration for the trinitrotoluene and dinitrotoluene and decantation or settling for the mononitrotoluene.

In order to more clearly point out my invention, the following example, in which all parts are by weight, is given.

Example 100 parts of a mixture consisting of 50% of pentaerythritol tetranitrate and 50% of trinitrotoluene were dissolved in 240 parts of acetone at room temperature, the mixture filtered to remove any insoluble foreign matter and the clear solution then treated with water, added in a thin stream or preferably as droplets to the acetone solution while the latter was being stirred vigorously. When about 150 parts of water had been added, the water-addition was discontinued and the mixture stirred for half an hour or more additional. The mixture was filtered and the pentaerythritol tetranitrate on the filter washed with an aqueous-acetone solution, followed by water and then dried. Weight 48 parts. This pentaerythritol tetranitrate was over 90% pure.

The filtrate obtained as just described was treated with about 300 parts of water, the mixture stirred for half an hour or more after all the water had been added, this mixture was then filtered and the trinitrotoluene on the filter washed with water and dried. Weight 51 parts.

Similarly, I may effect a separation of pentaerythritol tetranitrate from admixture with dinitrotoluene and mononitrotoluene, although the separation from the latter is not as thorough as from the other two due to the solvent effect of mononitrotoluene on pentaerythritol tetranitrate.

In the example given above I mention certain specific quantities of pentaerythritol tetranitrate, trinitrotoluene, acetone and water but I wish to make it clear that these quantities are given for purposes of illustration only and are not to be used to limit my invention except as indicated in the claims.

Certain explosive compositions contain about 70% pentaerythritol tetranitrate and 30% trinitrotoluene and others about 30% pentaerythritol tetranitrate and 70% trinitrotoluene, consequently, I find it advantageous to vary the proportions of acetone, etc. used. Also, I prefer in general to carry out my process at ordinary temperature although when the raw material started with contains appreciable mononitrotoluene I prefer to use a lower temperature.

As indicated above, my process is applicable not only to mixtures consisting of pentaerythritol tetranitrate and a nitrotoluene but also to mixtures containing graphite or bonding agents, aluminum, or ammonium nitrate in addition to the pentaerythritol tetranitrate and nitrotoluenes. In the latter instances a filtration step is introduced between the dissolving and the precipitation steps.

I claim:

1. The process for the recovery of pentaerythritol tetranitrate from mixtures comprising substantially pentaerythritol tetranitrate and a nitrotoluene, which comprises extracting such a mixture with acetone, filtering, adding water slowly to the filtrate, with stirring, up to the beginning of the separation of an oil-like product to effect the substantial precipitation of the pentaerythritol tetranitrate without the precipitation of any appreciable amount of nitrotoluene from the solution and filtering off the precipitated pentaerythritol tetranitrate.

2. The process for the recovery of pentaerythritol tetranitrate from mixtures comprising substantially pentaerythritol tetranitrate and trinitrotoluene which comprises dissolving the pentaerythritol tetranitrate and trinitrotoluene in acetone, filtering, adding water slowly, with stirring, to this solution up to the beginning of the separation of an oil-like product to effect the substantial precipitation of the pentaerythritol tetranitrate from the solution without the precipitation of any appreciable amount of trinitrotoluene, and filtering off the precipitated pentaerythritol tetranitrate.

JOSEPH A. WYLER.